United States Patent
Xiang

(10) Patent No.: US 11,102,286 B2
(45) Date of Patent: Aug. 24, 2021

(54) BANDWIDTH SCHEDULING METHOD AND DEVICE FOR CACHE SERVER

(71) Applicant: Wangsu Science & Technology Co., Ltd., Shanghai (CN)

(72) Inventor: Xiaomin Xiang, Shanghai (CN)

(73) Assignee: Wangsu Science & Technology Co., Ltd., Shanghai (CN)

( * ) Notice: Subject to any disclaimer, the term of this patent is extended or adjusted under 35 U.S.C. 154(b) by 0 days.

(21) Appl. No.: 17/060,032

(22) Filed: Sep. 30, 2020

(65) Prior Publication Data

US 2021/0037089 A1    Feb. 4, 2021

Related U.S. Application Data

(63) Continuation of application No. PCT/CN2020/074968, filed on Feb. 12, 2020.

(30) Foreign Application Priority Data

Jul. 11, 2019 (CN) .......................... 201910625761.9

(51) Int. Cl.
G06F 15/173 (2006.01)
H04L 29/08 (2006.01)
H04L 12/927 (2013.01)

(52) U.S. Cl.
CPC .......... H04L 67/101 (2013.01); H04L 47/805 (2013.01); H04L 67/1008 (2013.01); H04L 67/2842 (2013.01)

(58) Field of Classification Search
CPC . H04L 67/101; H04L 47/805; H04L 67/1008; H04L 67/2842; H04L 67/1023;

(Continued)

(56) References Cited

U.S. PATENT DOCUMENTS

| 2010/0131946 A1* | 5/2010 | Degaonkar | G06F 11/2028 718/1 |
| 2010/0220622 A1* | 9/2010 | Wei | H04L 41/0896 370/252 |
| 2015/0149611 A1* | 5/2015 | Lissack | H04L 43/16 709/224 |

FOREIGN PATENT DOCUMENTS

| CN | 102301338 A | 12/2011 |
| CN | 109889569 A | 6/2019 |

(Continued)

OTHER PUBLICATIONS

Wangsu Science & Technology Co., Ltd., International Search Report, PCT/CN2020/074968, dated Apr. 30, 2020, 4 pgs.

(Continued)

Primary Examiner — Johnny B Aguiar
(74) Attorney, Agent, or Firm — USCH Law, PC

(57) ABSTRACT

The present disclosure provides a bandwidth scheduling method for cache server that effectively improves the quality of network services. According to some embodiments, latest traffic information of a target cache server of each service type at a start time of a pre-determined detection period is acquired in accordance with the detection period; a target health value calculation formula and a rated health value of the target cache server are acquired, the target health value calculation formula being fitted based on historical health values of the target cache server and historical traffic information of each service type; bandwidth scheduling on the target cache server is performed based on the latest traffic information, the target health value calculation formula, and the rated health value.

16 Claims, 3 Drawing Sheets

Latest traffic information of a target cache server of each service type at a start time of a pre-determined detection period is acquired in accordance with the pre-determined detection period. — 101

A target health value calculation formula and a rated health value of the target cache server are acquired, the target health value calculation formula being fitted based on historical health values of the target cache server and historical traffic information of each service type. — 102

Bandwidth scheduling is performed on the target cache server based on the latest traffic information, the target health value calculation formula, and the rated health value. — 103

(58) Field of Classification Search
CPC .............. H04L 47/803; H04L 67/1029; H04L 67/1012
USPC ................................................ 709/224, 226
See application file for complete search history.

(56) References Cited

FOREIGN PATENT DOCUMENTS

| | | |
|---|---|---|
| CN | 110365765 A | 10/2019 |
| EP | 2351329 A1 | 8/2011 |

OTHER PUBLICATIONS

Wangsu Science & Technology Co., Ltd., Extended European Search Report, EP20775568.7, dated May 27, 2021, 13 pgs.

* cited by examiner

BANDWIDTH SCHEDULING METHOD AND DEVICE FOR CACHE SERVER

CROSS REFERENCE TO RELATED APPLICATIONS

The present application is a continuation of PCT Application No. PCT/CN2020/074968, entitled "Bandwidth Scheduling Method and Device for Cache Server," filed Feb. 12, 2020, which claims priority to Chinese Patent Application No. 201910625761.9, entitled "Bandwidth Scheduling Method and Device for Cache Server," filed on Jul. 11, 2019, each of which is incorporated herein by reference in its entirety.

TECHNICAL FIELD

The present disclosure relates to the field of Internet technology, in particular to a bandwidth scheduling method and a bandwidth scheduling device for cache server.

BACKGROUND

In CDN (Content Delivery Network) service, multiple cache servers are deployed on the existing Internet, so that users may acquire data from a closer or better cache server, to provide users with accelerated network services.

In order to prevent excessive load of the cache server due to high real-time bandwidth which affects the quality of network services, the CDN service provider may set a rated bandwidth for each cache deployed server and keep the real-time bandwidth of the cache server lower than the rated bandwidth through bandwidth scheduling. Specifically, technicians of the CDN service provider may collect the real-time bandwidth of each cache server through the background server in real time, and calculate the bandwidth call-out amount (that is, the amount of bandwidth needed to be scheduled to other cache servers to provide services) or calculate the bandwidth call-in amount (that is, the amount of bandwidth that the cache server may additionally carry) according to the real-time bandwidth and rated bandwidth of each cache server, and perform bandwidth scheduling according to the bandwidth call-out/call-in amount. For example, if the real-time bandwidth of a cache server collected by the background server is 800 megabytes, assuming that the cache server has a rated bandwidth of 700 megabytes, the background server may conclude that the bandwidth call-out amount of the cache server is 100 megabytes; assuming that the cache server has a rated bandwidth of 1000 megabytes, the background server may conclude that the bandwidth call-in amount of the cache server is 200 megabytes.

In the process of conceiving the present disclosure, the inventors found that the existing technology has at least the following problems:

Since the load capacity of a cache server is not only affected by the total amount of bandwidth carried, but also by factors such as the type of service requested and the number of connections, it may occur that the load of the cache server is still too high after bandwidth scheduling performed on the cache server according to the bandwidth call-out amount, or that the cache server is overloaded after bandwidth scheduling performed on the cache server according to the bandwidth call-in amount, which affects the quality of network services.

SUMMARY

In order to solve the problems in the existing technology, certain embodiments of the present disclosure provide a bandwidth scheduling method and a bandwidth scheduling device for cache server. The technical solutions are as follows.

In some embodiments, a bandwidth scheduling method for cache server is provided, and the method includes:

acquiring, in accordance with a pre-determined detection period, latest traffic information of a target cache server of each service type at a start time of the detection period;

acquiring a target health value calculation formula and a rated health value of the target cache server, the target health value calculation formula being fitted based on historical health values of the target cache server and historical traffic information of each service type; and performing bandwidth scheduling on the target cache server based on the latest traffic information, the target health value calculation formula, and the rated health value.

In some embodiments, the method further includes:

acquiring, in accordance with a pre-determined formula update period, statistical data of each performance indicator of the target cache server within a historical duration before a start time of the formula update period, and calculating the historical health values of the target cache server at each moment within the historical duration based on the statistical data and a pre-determined performance health formula; and acquiring the historical traffic information of the target cache server of each service type within the historical duration before the start time of the formula update period, and updating the target health value calculation formula of the target cache server based on the historical health values and the historical traffic information.

In some embodiments, the updating the target health value calculation formula of the target cache server based on the historical health values and the historical traffic information includes:

determining the target server category to which the target cache server belongs, and updating the target health value calculation formula of the target cache server based on the historical health values, the target server category, and the historical traffic information.

In some embodiments, the performing bandwidth scheduling on the target cache server based on the latest traffic information, the target health value calculation formula, and the rated health value includes:

calculating a target health value of the target cache server based on the target health value calculation formula and the latest traffic information, and judging whether the target health value is greater than the rated health value;

in response to the target health value being greater than the rated health value: calculating bandwidth amount of each client to which the latest traffic information belongs, selecting clients in succession as target call-out clients in the order of bandwidth amount from small to large, and calculating a health value of the target cache server; and performing bandwidth scheduling according to the target call-out clients when the health value of the target cache server is less than or equal to the rated health value.

In some embodiments, the performing bandwidth scheduling on the target cache server based on the latest traffic information, the target health value calculation formula, and the rated health value includes:

calculating a target health value of the target cache server based on the target health value calculation formula and the latest traffic information, and judging whether the target health value is greater than the rated health value;

in response to the target health value being not greater than the rated health value: determining call-out clients of cache servers other than the target cache server at a current moment, selecting the call-out clients in succession as target call-in clients in the order of bandwidth amount of the call-out clients from small to large, and calculating a health value of the target cache server; and performing bandwidth scheduling according to the target call-in clients when the health value of the target cache server is less than or equal to the rated health value and difference between the rated health value and the health value of the target cache server is less than or equal to a pre-determined difference value.

In some embodiments, the determining call-out clients of cache servers other than the target cache server at a current moment includes:

judging whether the target health value is less than an early warning health value; and determining the call-out clients of the cache servers other than the target cache server at the current moment when the target health value is less than the early warning health value.

In some embodiments, the performing bandwidth scheduling on the target cache server based on the latest traffic information, the target health value calculation formula, and the rated health value includes:

calculating a target health value of the target cache server based on the target health value calculation formula and the latest traffic information, and judging whether the target health value is greater than the rated health value;

in response to the target health value being greater than the rated health value: successively reducing traffic information of a target service type according to an adjustment gradient of the target service type corresponding to a target service category to which the target cache server belongs, and calculating a health value of the target cache server; and determining the reduced traffic information of the target service type as target call-out amount when the health value of the target cache server is less than or equal to the rated health value, and performing bandwidth scheduling according to the target call-out amount.

In some embodiments, the performing bandwidth scheduling on the target cache server based on the latest traffic information, the target health value calculation formula, and the rated health value includes:

calculating a target health value of the target cache server based on the target health value calculation formula and the latest traffic information, and judging whether the target health value is greater than the rated health value;

in response to the target health value being not greater than the rated health value: determining call-out amount of a target service type of cache servers other than the target cache server at a current moment, successively increasing traffic information of the target service type based on the call-out amount according to an adjustment gradient of the target service type, and calculating a health value of the target cache server; and determining the increased traffic information as target call-in amount when the health value of the target cache server is less than or equal to the rated health value, and difference between the rated health value and the health value of the target cache server is less than or equal to a pre-determined difference value, and performing bandwidth scheduling according to the target call-in amount.

In some embodiments, the performing bandwidth scheduling on the target cache server based on the latest traffic information, the target health value calculation formula, and the rated health value includes:

calculating a target health value of the target cache server based on the target health value calculation formula and the latest traffic information, and judging whether the target health value is greater than the rated health value;

in response to the target health value being greater than the rated health value: selecting a target call-out range from an adjustment range reference table of traffic information and health values of the target cache server, determining the target call-out range as target call-out amount, and performing bandwidth scheduling according to the target call-out amount.

In some embodiments, the performing bandwidth scheduling on the target cache server based on the latest traffic information, the target health value calculation formula, and the rated health value includes:

calculating a target health value of the target cache server based on the target health value calculation formula and the latest traffic information, and judging whether the target health value is greater than the rated health value;

in response to the target health value being not greater than the rated health value: selecting a target call-in range from the adjustment range reference table of the of traffic information and health values of the target cache server, determining the target call-in range as target call-in amount, and performing bandwidth scheduling according to the target call-in amount.

In some embodiments, the traffic information of each service type at least includes live broadcast bandwidth, the number of live broadcast connections, on-demand bandwidth, the number of on-demand connections, webpage bandwidth, and the number of webpage connections.

In some embodiments, a server is provided, including a processor and a memory. The memory stores at least one instruction, at least one program, a code set, or an instruction set, when loaded and executed by the processor, causing the processor to implement the aforementioned bandwidth scheduling method for the cache server.

In some embodiments, a computer-readable storage medium is provided, storing at least one instruction, at least one program, code set, or instruction set, when loaded and executed by a processor, causing the processor to implement the aforementioned bandwidth scheduling method for the cache server.

The beneficial effects brought by the technical solutions provided in the embodiments of the present disclosure are as follows. In the aforementioned embodiments, latest traffic information of the target cache server of each service type at the start time of a pre-determined detection period is acquired in accordance with the pre-determined detection period; a target health value calculation formula and a rated health value of the target cache server are acquired, the target health value calculation formula being fitted based on historical health values of the target cache server and historical traffic information of each service type; bandwidth scheduling is performed on the target cache server based on the latest traffic information, the target health value calculation formula, and the rated health value. In this way, the background server is able to determine the health status of the cache server based on the traffic information of the cache server of each service type, the health value calculation formula, and the rated health value, and to perform bandwidth scheduling on the cache server according to the traffic information of each service type to keep the load of the cache server in good condition, which may effectively improve the quality of network services.

BRIEF DESCRIPTION OF THE DRAWINGS

In order to illustrate the technical solutions in the embodiments of the present disclosure more clearly, the drawings used in the description of the embodiments will be briefly described below. It is obvious that the drawings in the following description are only some embodiments of the present disclosure. For those skilled in the art, other drawings may also be acquired in accordance with the drawings without any inventive effort.

DETAILED DESCRIPTION

In order to clarify the objective, the technical solutions and the advantages of the present disclosure, the embodiments of the present disclosure will be further described in details with reference to the accompany drawings.

The embodiments of the present disclosure provide a bandwidth scheduling method for cache server. The execution subject of the method may be a background server which may be any server, or a server cluster composed of multiple servers. The background server may be deployed in the computer room of the CDN service provider. The background server may perform bandwidth scheduling on cache server according to traffic information of each service type, based on the health value calculation formula of the cache server, the rated health value of the cache server, and the latest traffic information of the cache server. The above background server may include a processor, a memory, and a transceiver. The processor may be used to perform bandwidth scheduling processing on the cache server in the following process, the memory may be used to store the data required and generated in the following process and the transceiver may be used to receive and send related data in the following process.

Figure 1:
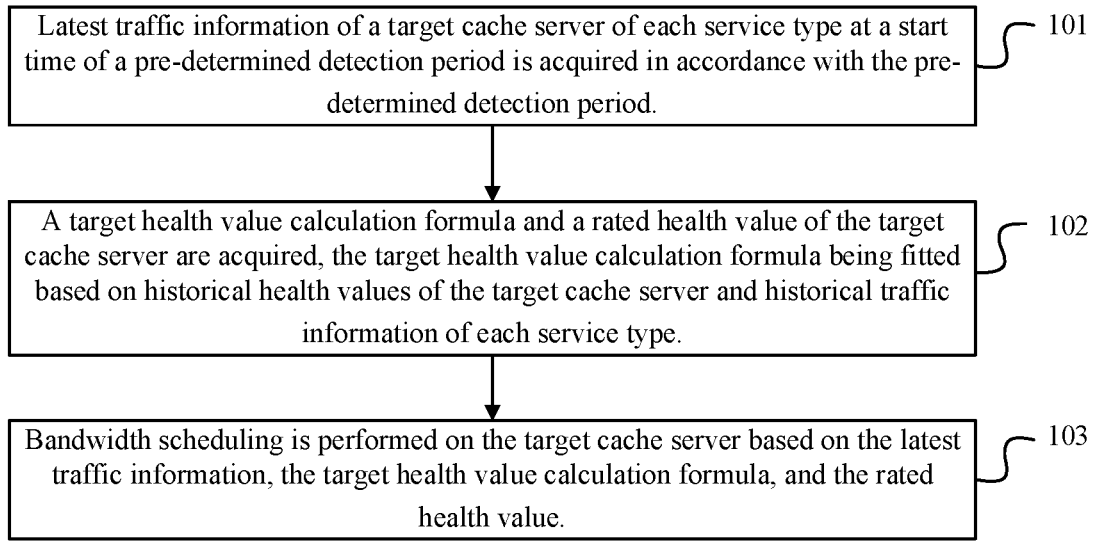
FIG. 1 is a flowchart of a bandwidth scheduling method for cache server provided by embodiments of the present disclosure.

The processing flow of the bandwidth scheduling method for cache server shown in FIG. 1 will be described in detail in combination with specific embodiments below. The content may be as follows.

Step 101: latest traffic information of a target cache server of each service type at a start time of a pre-determined detection period is acquired in accordance with the pre-determined detection period.

In implementation, CDN service providers may provide network acceleration services to clients through cache servers deployed in various regions. When providing network acceleration services to clients, each cache server may record statistical data of its own performance indicators (such as CPU utilization, memory utilization, connection response time, hard disk utilization, etc.), and traffic information generated of each service type. The traffic information of each service type may at least include live broadcast bandwidth, the number of live broadcast connections, on-demand bandwidth, the number of on-demand connections, webpage bandwidth, the number of webpage connections, etc. Considering that the bandwidth amount and the number of connections of different service types may affect the load status of the cache server at varying degrees, and that the excessive load of cache server will affect the network service quality of the cache server, technicians of the CDN service provider may perform bandwidth scheduling on the cache server according to each service type and the number of connections corresponding to each service type as granularity through the background server. Specifically, the background server may acquire, in accordance with a pre-determined detection period, the latest traffic information of a certain cache server (also called a target cache server) of each service type generated at the start time of the current detection period, such as live broadcast bandwidth, the number of live broadcast connections, on-demand bandwidth, the number of on-demand connections, webpage bandwidth, the number of webpage connections and so on generated at the start time of the current detection period. As a result, the background server may perform bandwidth scheduling on the target cache server according to the traffic information of each service type, based on the latest traffic information, the health value calculation formula of the target cache server (also called a target health value calculation formula), and the rated health value.

Step 102: a target health value calculation formula and a rated health value of the target cache server are acquired, the target health value calculation formula being fitted based on historical health values of the target cache server and historical traffic information of each service type.

In implementation, the background server may fit a health value calculation formula for each cache server based on historical health values of each cache server and historical traffic information of each cache server of each service type, and set a rated health value for each cache server, so that the background server may calculate a health value of the cache server through the health value calculation formula, and determine the load status of the cache server according to the calculated health value and the rated health value. When the calculated health value of the cache server is greater than the rated health value, it is determined that the cache server is unhealthy (that is, the load is too high); otherwise, it is determined that the cache server is healthy. After acquiring the latest traffic information of the target cache server of each service type at the start time of the detection period, the background server may acquire the target health value calculation formula of the target cache server and the rated health value of the target cache server, the target health value calculation formula being fitted based on the historical health values of the target cache server and the historical traffic information of each service type.

In some embodiments, the target health value calculation formula of the target cache server may be updated in accordance with a pre-determined formula update period, and the corresponding processing may be as follows: statistical data of each performance indicator of the target cache server within a historical duration before a start time of a pre-determined formula update period is acquired in accordance with the pre-determined formula update period; the historical health values of the target cache server at each moment within the historical duration are calculated based on the statistical data and a pre-determined performance health formula; the historical traffic information of the target cache server of each service type within the historical duration before the start time of the pre-determined formula update period is acquired; and the target health server calculation formula is updated based on the historical health values and the historical traffic information.

The historical traffic information of each service type at least includes live broadcast bandwidth, the number of live broadcast connections, on-demand bandwidth, the number of on-demand connections, webpage bandwidth, and the number of webpage connections.

In implementation, technicians of the CDN service provider may pre-determine the health value calculation formula (also called the pre-determined performance health formula) for each cache server with more than one of the above performance indicators (such as CPU utilization, memory utilization, connection response time, hard disk utilization, etc.) as variables. And then the background server may acquire, in accordance with the pre-determined formula update period, the statistical data of each performance indicator of the target cache server within the historical duration (for example, 1 hour) before the start time of the current formula update period, and based on the statistical data and the pre-determined performance health formula of the target cache server, calculate the historical health values of the target cache server at each moment within the above historical duration (for example, the historical health values of the target cache server may be calculated with 1 minute as granularity). For example, if the pre-determined performance health formula of the target cache server is QOS=ax+by+cz+dk, with QOS representing the health value, x representing the CPU utilization, y representing the memory utilization, z representing the connection response time, and k representing hard disk utilization, a, b, c, and d representing the coefficients corresponding to each performance indicator, respectively, assuming that the CPU utilization, the memory utilization, the connection response time, and the hard disk utilization of the cache server at 10:00 are 70%, 75%, 0.1 s, and 80%, respectively, and a, b, c, and d are 40, 30, 20, and 30, respectively, then the health value of the cache server at 10:00 may be calculated as HV=0.7×40+0.75×30+0.1×20+0.8×30=76.5.

After calculating the historical health values of the target cache server at each moment within the above historical duration, the background server may acquire the historical traffic information of the target cache server of each service type within the historical duration before the start time of the formula update period, and count historical traffic information at each moment corresponding to the historical health values based on the acquired historical traffic information. Then, the background server may use regression analysis models (such as linear regression, polynomial regression, etc.) in machine learning to fit the health value calculation formula of the target cache server based on the counted historical traffic information of each service type corresponding to each moment and the historical health values corresponding to the above each moment, and update the target health value calculation formula of the target cache server with the currently fitted health value calculation formula.

In some embodiments, the background server may also update the target health value calculation formula in combination with server category of the target cache server. The corresponding processing may be as follows: a target server category to which the target cache server belongs is determined, and the target health value calculation formula of the target cache server is updated based on the historical health values, the target server category and the historical traffic information.

In implementation, considering that different hardware configurations (such as CPU, memory, hard disk, etc.) of the cache server may affect the load capacity of the cache server at different degrees, technicians of the CDN service provider may divide the cache servers into various server categories through the background server according to the hardware configurations of the cache servers. For example, the cache servers with the same hardware configurations such as CPU, memory, and hard disk may be divided into the same server category. In this way, the background server may determine the server category to which the target cache server belongs (also called target server category) after acquiring the historical traffic information of the target cache server of each service type within the historical duration before the start time of the formula update period, so as to update the target health value calculation formula of the target cache server based on the server category of the target cache server, the historical health values of the target cache server at each moment within the historical duration, and the historical traffic information of the target cache server of each service type within the historical duration before the start time of the formula update period.

Step 103: bandwidth scheduling is performed on the target cache server based on the latest traffic information, the target health value calculation formula, and the rated health value.

In implementation, after acquiring the latest traffic information, the target health value calculation formula, and the rated health value of the target cache server, the background server may calculate the health value of the target cache server based on the latest traffic information of the target cache server and the target health value calculation formula of the target cache server. Then, the background server may perform bandwidth scheduling on the target cache server according to the health value of the target cache server, the rated health value of the target cache server, the target health value calculation formula, and the aforementioned latest traffic information. For example, the target health value calculation formula of the target cache server is: $QOS=a_1x_1+a_2x_2+a_3x_3+b_1x_4+b_2x_5+b_3x_6$, with QOS representing the health value of the target cache server, $x_1$ representing the live broadcast bandwidth of the target cache server at the current moment, $x_2$ representing the on-demand bandwidth of the target cache server at the current moment, $x_3$ representing the webpage bandwidth of the target cache server at the current moment, $x_4$ representing the number of live broadcast connections of the target cache server at the current moment, $x_5$ representing the number of on-demand connections of the target cache server at the current moment, and $x_6$ representing the number of webpage connections of the target cache server at the current moment, and $a_1$, $a_2$, $a_3$, $b_1$, $b_2$, $b_3$ representing the corresponding coefficients of the traffic information of each service type, respectively. Assuming that the latest traffic information of the target cache server of each service type at 10:00 respectively are live broadcast bandwidth of 800 megabytes, on-demand bandwidth of 700 megabytes, webpage bandwidth of 900 megabytes, the number of live broadcast connections of 20, the number of on-demand connections of 15, the number of webpage connections of 40, and that $a_1$, $a_2$, $a_3$, $b_1$, $b_2$, $b_3$ are 0.03, 0.04, 0.02, 0.35, 0.2, 0.1 respectively, the background server may calculate the health value of the target cache server based on the above target health value calculation formula as QOS=0.03×800+0.04×700+0.02×900+0.35 20+0.2×15+0.1×40=84.

In some embodiments, the background server may perform bandwidth call-out on the target cache server when the target health value of the target cache server is greater than the rated health value. Correspondingly, the processing of the aforementioned step 103 may include: the target health value of the target cache server is calculated based on the target health value calculation formula and the latest traffic information, and whether the target health value is greater than the rated health value is judged; if it is, then bandwidth amount of each client to which the latest traffic information belongs is calculated, clients are successively selected as target call-out clients in the order of bandwidth amount from small to large, and the health value of the target cache server is calculated; when the health value of the target cache server is less than or equal to the rated health value, bandwidth scheduling is performed according to the target call-out client.

In implementation, after acquiring the latest traffic information of the target cache server of each service type at the start time of the pre-determined detection period, the background server may calculate the health value of the target cache server (also called the target health value) at the start time of the pre-determined detection period based on the latest traffic information of the foregoing service types and the target health value calculation formula. Then the background server may judge whether the aforementioned target health value is greater than the rated health value. If the aforementioned target health value is greater than the rated health value, the background server may calculate the bandwidth amount of each client to which the aforementioned latest traffic information belongs, and sort all of the aforementioned clients in the order of bandwidth amount from small to large. Then, the background server may successively select the aforementioned clients and mark them as call-out clients (also called the target call-out clients) in the order of bandwidth amount from small to large, calculate the health value of the target cache server after each marking, and compare the calculated health value with the rated health value. Once the health value of the target cache server calculated after a certain target call-out client is marked is less than or equal to the rated health value, the background server may stop marking and to perform bandwidth scheduling on the target cache server according to the above target call-out client. For example, if the target health calculation formula of target cache server is $QOS=0.03x_1+0.04x_2+0.02x_3+0.35x_4+0.2x_5+0.1x_6$, it is assumed that the rated health value of the target cache server is 75, the clients to which the latest traffic information belongs include clients $C_1$, $C_2$, and $C_3$, and the traffic information of each service type corresponding to the clients $C_1$, $C_2$, and $C_3$ is shown in Table 1.

TABLE 1

| Client | Live broadcast bandwidth (M) | On-demand bandwidth (M) | Webpage bandwidth (M) | Number of live broadcast connections (pcs) | Number of on-demand connections (pcs) | Number of webpage connections (pcs) |
|---|---|---|---|---|---|---|
| $C_1$ | 250 | 180 | 170 | 5 | 7 | 9 |
| $C_2$ | 400 | 500 | 400 | 8 | 10 | 12 |
| $C_3$ | 280 | 320 | 380 | 7 | 8 | 15 |

The background server may calculate the target health value of the target cache server as $QOS=0.03\times(250+400+280)+0.04\times(180+500+320)+0.02\times(170+400+380)+0.35\times(5+8+7)+0.2\times(7+10+8)+0.1\times(9+12+15)=102.5$. It can be seen that the target health value of the target cache server is much larger than the rated health value. Then, the background server may calculate the bandwidth amount of each client to which the aforementioned latest traffic information belongs, and sort them in the order of bandwidth amount from small to large, as shown in Table 2.

Then, the background server may mark the client $C_1$ as the target call-out client and calculate the health value of the target cache server as $QOS=0.03\times(280+400)+0.04\times(320+500)+0.02\times(380+400)+0.35\times(7+8)+0.2\times(8+10)+0.1\times(15+12)=80.35$, which is still greater than the rated health value. Then the background server may further mark client $C_3$ as the target call-out client (that is, client $C_1$ and client $C_3$ are both marked as the target call-out clients) and calculate the health value of the target cache server as $QOS=0.03\times400+0.04\times500+0.02\times400+0.35\times8+0.2\times10+0.1\times12=46$, which is less than the rated health value. Then the background server may perform bandwidth scheduling on the target cache server according to the aforementioned target call-out clients (that is, client $C_1$ and client $C_3$).

In some embodiments, the background server may perform bandwidth call-in on the target cache server when the target health value of the target cache server is less than the rated health value. Correspondingly, the processing of the aforementioned step 103 may include: the target health value of the target cache server is calculated based on the target health value calculation formula and the latest traffic information, and whether the target health value is greater than the rated health value is judged; if it is not, call-out clients of cache servers other than the target cache server at a current moment are determined, the call-out clients are successively selected as target call-in clients in the order of bandwidth amount of the call-out clients from small to large, and the health value of the target server is calculated; when the health value of the target cache server is less than or equal to the rated health value, and difference between the rated health value and the health value of the target cache server is less than or equal to a pre-determined difference value, bandwidth scheduling is performed according to the target call-in clients.

In implementation, when bandwidth scheduling is performed and the difference between the health value of the cache server and the rated health value is small, the cache server may no longer be able to carry the traffic from other clients. Therefore, in order to prevent the background server from taking up more network resources to calculate and compare the health value of this circumstance, technicians of the CDN service provider may set a threshold for the difference between the health value and the rated health value of each cache server (also called a pre-determined difference), so that the background server would not perform

TABLE 2

| Client | Bandwidth amount (M) | Live broadcast bandwidth (M) | On-demand bandwidth (M) | Webpage bandwidth (M) | Number of live broadcast connections (pcs) | Number of on-demand connections (pcs) | Number of webpage connections (pcs) |
|---|---|---|---|---|---|---|---|
| $C_1$ | 600 | 250 | 180 | 170 | 5 | 7 | 9 |
| $C_3$ | 980 | 280 | 320 | 380 | 7 | 8 | 15 |
| $C_2$ | 1300 | 400 | 500 | 400 | 8 | 10 | 12 | the aforementioned calculation and comparison processing when the difference between the health value and the rated health value of the cache server is less than or equal to the pre-determined difference. Specifically, after calculating the target health value of the target cache server at the start time of the pre-determined detection period, the background server may judge whether the aforementioned target health value is greater than the rated health value. If the aforementioned target health value is less than the rated health value, the background server may determine the call-out clients of the cache servers other than the target cache server at the current moment, and sort all the aforementioned call-out clients in the order of bandwidth amount from small to large. Then, the background server may select the aforementioned call-out clients and mark them as call-in clients (also called target call-in clients) in the order of bandwidth amount from small to large, calculate the health value of the target cache server after each marking, and compare the health value with the rated health value. When the health value of the target cache server calculated after a certain marking is less than or equal to the rated health value, and the difference between the rated health value and the health value of the target cache server is less than or equal to the pre-determined difference, the background server may perform bandwidth scheduling on the target cache server according to the aforementioned target call-in clients. For example, if the target health calculation formula of target cache server is $QOS=0.03x_1+0.04x_2+0.02x_3+0.35x_4+0.2x_5+0.1x_6$, it is assumed that the rated health value of the target cache server is 85, the clients to which the latest traffic information belongs include clients $C_4$ and $C_5$, and the traffic information of each service type corresponding to the clients $C_4$ and $C_5$ is shown in Table 3.

TABLE 3

| Client | Live broadcast bandwidth (M) | On-demand bandwidth (M) | Webpage bandwidth (M) | Number of live broadcast connections (pcs) | Number of on-demand connections (pcs) | Number of webpage connections (pcs) |
|---|---|---|---|---|---|---|
| $C_4$ | 200 | 150 | 210 | 5 | 6 | 9 |
| $C_5$ | 300 | 280 | 320 | 9 | 7 | 10 |

The background server may calculate the target health value of the target cache server as $QOS=0.03\times(200+300)+0.04\times(150+280)+0.02\times(210+320)+0.35\times(5+9)+0.2\times(6+7)+0.1\times(9+10)=52.2$. It can be seen that the target health value of the target cache server is less than the rated health value. Then, the background server may determine the call-out clients of the cache servers other than the target cache server at the current moment. Assuming that the call-out clients of other cache servers include clients $C_6$, $C_7$, $C_8$, which are sorted in the order of bandwidth amount from small to large, as shown in table 4.

target cache server as $QOS=0.03\times(200+300+150)+0.04\times(150+280+120)+0.02\times(210+320+130)+0.35\times(5+9+3)+0.2\times(6+7+4)+0.1\times(9+10+3)=66.25$, which is still less than the rated health value, and the difference between the rated health value and the health value is greater than the pre-determined difference that is assumed to be 5. Then the background server may further mark the client $C_5$ as the target call-in client (that is, both clients $C_6$ and $C_5$ are marked as the target call-in clients) and calculate the health value of the target cache server as $QOS=0.03\times(200+300+150+190)+0.04\times(150+280+120+180)+0.02\times(210+320+130+130)+0.35\times(5+9+3+4)+0.2\times(6+7+4+3)+0.1\times(9+10+3+3)=8405$ which is less than the rated health value, and the difference between the rated health value and the health value is less than the pre-determined difference. Then the background server may perform bandwidth scheduling on the target cache server according to the aforementioned target call-in clients (i.e. client $C_6$ and client $C_5$).

In some embodiments, the background server may perform bandwidth call-in when the aforementioned target health value is less than an early warning health value. The process that call-out clients of cache servers other than the target cache server at a current moment are determined may include: whether the target health value is less than the early warning health value is judged; when the target health value is less than the early warning health value, the call-out clients of the cache servers other than the target cache server at the current moment are determined.

In implementation, when the target health value is less than the rated health value, the background server may take up more network resources to perform the aforementioned processing. Therefore, technicians of the CDN service provider may set an early warning health value for each cache server through the background server. In this way, when the target health value of the target cache server is less than the rated health value, the background server may further judge whether the target health value is less than the early warning health value. When the target health value is less than the early warning health value, the background server may determine the call-out clients of the cache servers other than the target cache server at the current moment, successively select the call-out clients in the order of bandwidth amount of the call-out clients from small to large as the target call-in

TABLE 4

| Client | Bandwidth amount (M) | Live broadcast bandwidth (M) | On-demand bandwidth (M) | Webpage bandwidth (M) | Number of live broadcast connections (pcs) | Number of on-demand connections (pcs) | Number of webpage connections (pcs) |
|---|---|---|---|---|---|---|---|
| $C_6$ | 400 | 150 | 120 | 130 | 3 | 4 | 3 |
| $C_8$ | 500 | 190 | 180 | 130 | 4 | 3 | 3 |
| $C_7$ | 800 | 220 | 280 | 300 | 5 | 8 | 10 |

Then, the background server may mark the client $C_6$ as the target call-in client, and calculate the health value of the clients, and calculate the health value of the target cache server. When the health value of the target cache server is less than or equal to the rated health value, and the difference between the rated health value and the health value of the target cache server is less than or equal to the pre-determined difference value, the background server may perform bandwidth scheduling according to the target call-in clients. Otherwise, the background server does not need to do any processing.

In some embodiments, when the target health value is greater than the rated health value, the background server may perform bandwidth call-out on the target cache server according to an adjustment gradient of the service type corresponding to the target service category of the target cache server. Correspondingly, the processing of the aforementioned step 103 may include: the target health value of the target cache server is calculated based on the target health value calculation formula and the latest traffic information, and whether the target health value is greater than the rated health value is judged; if it is, traffic information of a target service type is successively reduced according to an adjustment gradient of the target service type corresponding to a target service category to which the target cache server belongs, and the health value of the target cache server is calculated; when the health value of the target cache server is less than or equal to the rated health value, the reduced traffic information of the target service type is determined as target call-out amount, and bandwidth scheduling is performed according to the target call-out amount.

In implementation, since the service types of the network services primarily provided by each cache server may be different from one another, technicians of the CDN service provider may classify each cache server as a certain server category by the service type through the background server. For example, if a certain cache server primarily provides a network service of live broadcast, the background server may classify the cache server as a live broadcast category and set corresponding adjustment gradients for each service type, such as reducing/increasing several connections at a time. In this way, after acquiring the latest traffic information of the target cache server of each service type at the start time of the pre-determined detection period, the background server may calculate the target health value of the target cache server at the start time of the pre-determined detection period based on the latest traffic information of each service type and the aforementioned target health value calculation formula, and judge whether the target health value is greater than the aforementioned rated health value. If it is, the background server may determine the service category to which the target cache server belongs (also called the target service category) and the adjustment gradient of the service type (also called the target service type) corresponding to the target service category. Then, the background server may successively reduce the traffic information of the target service type according to the adjustment gradient of the target service type, and calculate the health value of the target cache server. When the health value of the target cache server calculated by the background server is less than or equal to the rated health value, the background server may determine the aforementioned reduced traffic information of target service type as the traffic to be called out from the target cache server (also called the target call-out amount), and perform bandwidth scheduling on the target cache server according to the target call-out amount. For example, it is assumed that the target cache server belongs to the live broadcast category, the adjustment gradient corresponding to the live broadcast service type is three connections, and the target cache server's rated health value is 80, and the target health value of the target cache server is 90. In this case, the background server may sort all live broadcast connections in the acquired latest traffic information of the target cache server in the order of live broadcast bandwidth corresponding to each live broadcast connection from small to large, as shown in table 5. Then, the background server may first select the three live broadcast connections with the smallest live broadcast bandwidth (ie, connection 3, connection 5, connection 1) and their corresponding live broadcast bandwidth, mark them as the call-out amount, and calculate the health value of the target cache server. If the calculated health value is still greater than 80, the background server may then select further three live broadcast connections (i.e., connection 8, connection 2, connection 4) with the smallest live broadcast bandwidth from all the live broadcast connections that are not marked as the call-out amount and their corresponding live broadcast bandwidth, mark them as the call-out amount, and calculate the health value of the target cache server. If the calculated health value is still greater than 80 at this time, the background server may repeat the aforementioned process of selecting live broadcast connections and their corresponding live broadcast bandwidth, marking them as the call-out amount and calculating the health value. Otherwise, if the health value calculated at this time is less than or equal to 80, the background server may determine all live broadcast connections that have been marked as the call-out amount (i.e. connection 3, connection 5, connection 1, connection 8, connection 2, connection 4) and its corresponding live broadcast bandwidth as the target call-out amount, and perform bandwidth scheduling on the target cache server according to the target call-out amount.

TABLE 5

| Connection 3 | Connection 5 | Connection 1 | Connection 8 | Connection 2 | Connection 4 | Connection 6 | Connection 11 | Connection 10 | Connection 7 | Connection 9 |
|---|---|---|---|---|---|---|---|---|---|---|
| 150 | 180 | 195 | 210 | 220 | 240 | 255 | 270 | 290 | 305 | 330 |

In some embodiments, when the target health value is less than the rated health value, the background server may perform bandwidth call-in on the target cache server according to the adjustment gradient of the service type corresponding to the target service category of the target cache server. Correspondingly, the processing of the aforementioned step 103 may include: the target health value of the target cache server is calculated based on the target health value calculation formula and the latest traffic information, and whether the target health value is greater than the rated health value is judged; if it is not, call-out amount of a target service type of cache servers other than the target cache server at a current moment is determined, traffic information of the target service type is successively increased based on the call-out amount according to an adjustment gradient of the target service type, and the health value of the target cache server is calculated; when the health value of the target cache server is less than or equal to the rated health value, and difference between the rated health value and the health value of the target cache server is less than or equal to a pre-determined difference value, the increased traffic information is determined as target call-in amount and bandwidth scheduling is performed according to the target call-in amount.

In implementation, after calculating the target health value of the target cache server at the start time of the pre-determined detection period, the background server may determine the rated health value of the target cache server and judge whether the aforementioned target health value is greater than rated health value. If it is not, the background server may determine the call-out amount of the cache servers other than target cache server at the current moment, and sort the call-out amount of the other cache servers in the order of bandwidth amount from small to large. Then, the background server may successively increase the traffic information of the target service type according to the aforementioned adjustment gradient of the target service type, and calculate the health value of the target cache server. When the health value of the target cache server calculated by the background server is less than or equal to the aforementioned rated health value, and the difference between the rated health value and the health value is less than or equal to the aforementioned pre-determined difference value, the background server may determine the aforementioned increased traffic information of the target service type as the traffic to be call in to the target cache server (also called the target call-in amount), and perform bandwidth scheduling on the target cache server according to the target call-in amount. For example, it is assumed that the target cache server belongs to the live broadcast category, and the adjustment gradient corresponding to the live broadcast service type is three connections, the rated health value of the target cache server is 80, the target health value of the target cache server is 50, and the pre-determined difference value is 5. In this case, the background server may determine the call-out amount of all cache servers other than the target cache server at the current moment, and sort the call-out amount of all other cache servers in the order of live broadcast bandwidth corresponding to each live broadcast connection from small to large, as shown in see Table 6. Then, the background server may first select three live broadcast connections with the smallest live broadcast bandwidth (i.e. connection 7, connection 2, connection 5) and their corresponding live broadcast bandwidth, mark them as the call-in amount and calculate the health value of the target cache server. If the calculated health value is still less than the rated health value at this time, and the difference between the rated health value and the health value is greater than the pre-determined difference value, the background server may further select three live broadcast connections (i.e. connection 11, connection 1, connection 9) with the smallest live broadcast bandwidth from all the live broadcast connections that are not marked as the call-in amount and their corresponding live broadcast bandwidth, mark them as the call-in amount and calculate the health value of the target cache server. If the calculated health value is still less than the rated health value at this time, and the difference between the rated health value and the health value is greater than the pre-determined difference value, the background server may repeat the process of selecting the live broadcast connections and their corresponding live broadcast bandwidth, marking them as the call-in amount and calculating the health value. Otherwise, if the calculated health value is less than or equal to 80 at this time, and the difference between the rated health value and the health value is less than or equal to the pre-determined difference value, the background server may determine all the live broadcast connections that has been marked as the call-in amount (i.e. connection 7, connection 2, connection 5, connection 11, connection 1, connection 9) and their corresponding live broadcast bandwidth as the target call-in amount, and perform bandwidth scheduling on the target cache server according to the target call-in amount.

TABLE 6

| Connection 7 | Connection 2 | Connection 5 | Connection 11 | Connection 1 | Connection 9 | Connection 4 | Connection 3 | Connection 6 | Connection 10 | Connection 8 |
|---|---|---|---|---|---|---|---|---|---|---|
| 150 | 180 | 195 | 210 | 220 | 240 | 255 | 270 | 290 | 305 | 330 |

In some embodiments, when the target health value is greater than the rated health value, the background server may perform bandwidth scheduling on the target server according to an adjustment range reference table of traffic information and health values corresponding to the target cache server. Correspondingly, the processing of the aforementioned step 103 may include: the target health value of the target cache server is calculated based on the target health value calculation formula and the latest traffic information, and whether the target health value is greater than the rated health value is judged; if it is, a target call-out range is selected from an adjustment range reference table of the traffic information and health values of the target cache server, the target call-out range is determined as target call-out amount, and bandwidth scheduling is performed according to the target call-out amount.

In implementation, considering that the aforementioned processing of bandwidth scheduling performed on the target cache server based on the target health value calculation formula, the rated health value, and the latest traffic information may take up more network resources, technicians of the CDN service provider may set an adjustment range reference table of the health value and the traffic information for each cache server through the background server. In this way, after acquiring the latest traffic information of the target cache server of each service type at the start time of the pre-determined detection period, the background server may calculate the target health value of the target cache server at the start time of the pre-determined detection period based on the latest traffic information of each service type and the aforementioned target health value calculation formula. Then, the background server may judge whether the target health value is greater than the rated health value. If it is, the background server may select corresponding scheduling range from the aforementioned adjustment range reference table of the health value and the traffic information as the call-out range (also called the target call-out range), determine the target call-out range as the target call-out amount and perform bandwidth scheduling on the target cache server based on the target call-out amount. For example, it is assumed that the target cache server's rated health value is 80, the adjustment range reference table of the health value and the traffic information corresponding to the target cache server are shown in Table 7, and the target cache server's health value is 65. In this case, the background server may determine that the absolute value of the difference between the target cache server's health value and the rated health value is 15. At this time, the background server may select a scheduling range from all scheduling solutions corresponding to the difference ranged from 10 to 20.

TABLE 7

| Range of difference between health value and rated health value (absolute value) | Scheduling solution | Bandwidth amount | Number of connections |
|---|---|---|---|
| 10 to 20 | Scheduling range 1 | 450 | 3 |
|  | Scheduling range 2 | 350 | 4 |
|  | Scheduling range 3 | 300 | 6 |
| 20 to 30 | Scheduling range 1 | 1000 | 5 |
|  | Scheduling range 2 | 900 | 6 |
|  | Scheduling range 3 | 800 | 7 |

It is assumed that the traffic information of each service type of the target cache server is shown in Table 8, and the background server may preferentially judge whether there are three connections with corresponding total bandwidth of 450M. It may be seen from Table 6 that the sum of the bandwidth of connections 3, connection 4 and connection 6 is 450M. Therefore, the background server may determine the connection 3, the connection 4, connection 6 and the live broadcast bandwidth corresponding to the three connections as the target call-out amount, and perform bandwidth scheduling on the target cache server according to the target call-out amount.

TABLE 8

|  | Connection 1 | Connection 2 | Connection 3 | Connection 4 | Connection 5 | Connection 6 | Connection 7 | Connection 8 | Connection 9 |
|---|---|---|---|---|---|---|---|---|---|
| Bandwidth (M) | 100 | 150 | 120 | 130 | 160 | 200 | 210 | 190 | 250 |

In some embodiments, when the target health value is less than the rated health value, the background server may perform bandwidth call-in on the target cache server according to an adjustment range reference table of the health value and the traffic information corresponding to the target cache server. Correspondingly, the processing of the aforementioned step 103 may include: the target health value of the target cache server is calculated based on the target health value calculation formula and the latest traffic information, and whether the target health value is greater than the rated health value is determined; if it is not, a target call-in range is selected from the adjustment range reference table of traffic information and health values of the target cache server, the target call-in range is determined as target call-in amount, and bandwidth scheduling is performed according to the target call-in amount.

In implementation, after calculating the target health value of the target cache server at the start time of the pre-determined detection period, the background server may judge whether the target health value is greater than the rated health value. If it is not, the background server may select the corresponding scheduling range from the aforementioned adjustment range reference table of the health value and the traffic information as the call-in range (also called the target call-in range), and then the background server may determine the target call-in range as the target call-in amount, and may perform bandwidth scheduling on the target cache server based on the target call-in amount.

In this embodiment, latest traffic information of the target cache server of each service type at the start time of a pre-determined detection period is acquired in accordance with the pre-determined detection period; a target health value calculation formula and a rated health value of the target cache server are acquired, the target health value calculation formula being fitted based on historical health values of the target cache server and historical traffic information of each service type; bandwidth scheduling is performed on the target cache server based on the latest traffic information, the target health value calculation formula, and the rated health value. In this way, the background server is able to determine the health status of the cache server based on the traffic information of the cache server of each service type, the health value calculation formula, and the rated health value, and to perform bandwidth scheduling on the cache server according to the traffic information of each service type to keep the load of the cache server in good condition, which may effectively improve the quality of network services.

Figure 2:
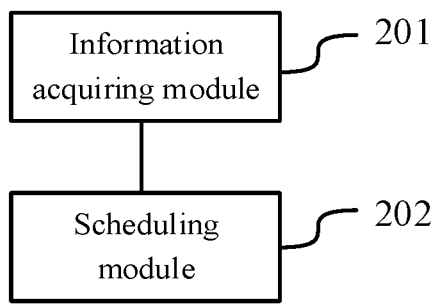
FIG. 2 is a structural schematic diagram of a bandwidth scheduling device for cache server provided by embodiments of the present disclosure.

Based on the same technical concept, the embodiments of the present disclosure further provide a bandwidth scheduling device for cache server. As shown in FIG. 2, the device includes an information acquiring module 201 and a scheduling module 202.

The information acquiring module 201 is configured to acquire, in accordance with a pre-determined detection period, latest traffic information of a target cache server of each service type at the start time of the pre-determined detection period; and to acquire a target health value calculation formula and a rated health value of the target cache server, the target health value calculation formula being fitted based on historical health values of the target cache server and historical traffic information of each service type.

The scheduling module 202 is configured to perform bandwidth scheduling on the target cache server based on the latest traffic information, the target health value calculation formula, and the rated health value.

Figure 3:
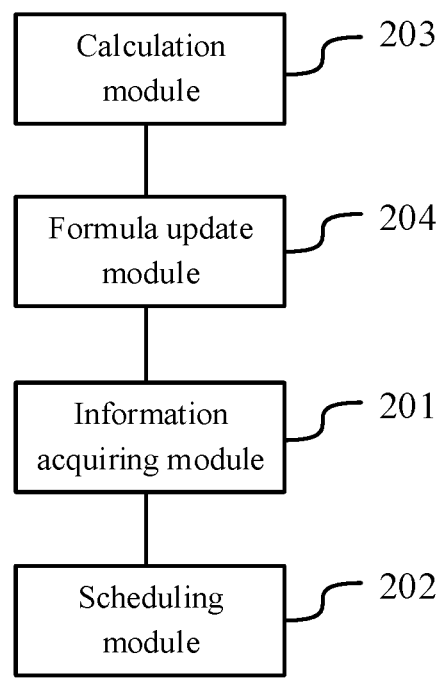
FIG. 3 is a structural schematic diagram of a bandwidth scheduling device for cache server provided by embodiments of the present disclosure.

In some embodiments, as shown in FIG. 3, the device further includes a calculation module 203 and a formula update module 204.

The calculation module 203 is configured to acquire, in accordance with a pre-determined formula update period, statistical data of each performance indicator of the target cache server within a historical period before a start time of the formula update period, and calculate the historical health values of the target cache server at each moment within the historical duration based on the statistical data and a pre-determined performance health formula.

The formula update module 204 is configured to acquire the historical traffic information of the target cache server of each service type within the historical duration before the start time of the formula update period, and update the target health value calculation formula of the target cache server based on the historical health values and the historical traffic information.

In some embodiments, the formula update module 204 is further configured to:

determine a target server category to which the target cache server belongs, and update the target health value calculation formula of the target cache server based on the historical health values, the target server category, and the historical traffic information.

In some embodiments, the device further includes a determination module configured to:

calculate a target health value of the target cache server based on the target health value calculation formula and the latest traffic information, and judge whether the target health value is greater than the rated health value.

The scheduling module 202 is further configured to:

if the target health value is greater than the rated health value, calculate bandwidth amount of each client to which the latest traffic information belongs, successively select clients as target call-out clients in the order of bandwidth amount from small to large, and calculate the health value of the target cache server; and perform bandwidth scheduling according to the target call-out clients when the health value of the target cache server is less than or equal to the rated health value.

In some embodiments, the scheduling module 202 is further configured to:

if the target health value is not greater than the rated health value, determine call-out clients of cache servers other than the target cache server at a current moment, successively select the call-out clients as target call-in clients in the order of bandwidth amount of the call-out clients from small to large, and calculate the health value of the target cache server; and perform bandwidth scheduling according to the target call-in clients when the health value of the target cache server is less than or equal to the rated health value and difference between the rated health value and the health value of the target cache server is less than or equal to a pre-determined difference value.

In some embodiments, the scheduling module 202 is further configured to:

if the target health value is not greater than the rated health value, judge whether the target health value is less than the early warning health value; and determine the call-out clients of the cache servers other than the target cache server at the current moment when the target health value is less than the early warning health value.

In some embodiments, the determination module is configured to:

calculate a target health value of the target cache server based on the target health value calculation formula and the latest traffic information, and judge whether the target health value is greater than the rated health value;

the scheduling module 202 is further configured to:

if the target health value is greater than the rated health value, successively reduce traffic information of a target service type according to an adjustment gradient of the target service type corresponding to the target service category to which the target cache server belongs, and calculate the health value of the target cache server; and determine the reduced traffic information of the target service type as target call-out amount when the health value of the target cache server is less than or equal to the rated health value, and perform bandwidth scheduling according to the target call-out amount.

In some embodiments, the scheduling module 202 is further configured to:

if the target health value is not greater than the rated health value, determine call-out amount of a target service type of cache servers other than the target cache server at a current moment, successively increase traffic information of the target service type based on the call-out amount according to an adjustment gradient of the target service type, and calculate the health value of the target cache server; and determine the increased traffic information as target call-in amount when the health value of the target cache server is less than or equal to the rated health value, and difference between the rated health value and the health value of the target cache server is less than or equal to a pre-determined difference value, and perform bandwidth scheduling according to the target call-in amount.

In some embodiments, the determination module is configured to:

calculate a target health value of the target cache server based on the target health value calculation formula and the latest traffic information, and determine whether the target health value is greater than the rated health value;

the scheduling module 202 is further configured to:

if the target health value is greater than the rated health value, select a target call-out range from an adjustment range reference table of traffic information and health values of the target cache server, determine the target call-out range as target call-out amount, and perform bandwidth scheduling according to the target call-out amount.

In some embodiments, the scheduling module 202 is further configured to:

if the target health value is not greater than the rated health value, select a target call-in range from the adjustment range reference table of the of traffic information and health values of the target cache server, determine the target call-in range as target call-in amount, and perform bandwidth scheduling according to the target call-in amount.

In some embodiments, the traffic information of each service type at least includes live broadcast bandwidth, the number of live broadcast connections, on-demand bandwidth, the number of on-demand connections, webpage bandwidth, and the number of webpage connections.

In this embodiment, latest traffic information of the target cache server of each service type at the start time of a pre-determined detection period is acquired in accordance with the pre-determined detection period; a target health value calculation formula and a rated health value of the target cache server are acquired, the target health value calculation formula being fitted based on historical health values of the target cache server and historical traffic information of each service type; bandwidth scheduling is performed on the target cache server based on the latest traffic information, the target health value calculation formula, and the rated health value. In this way, the background server is able to determine the health status of the cache server based on the traffic information of the cache server of each service type, the health value calculation formula, and the rated health value, and to perform bandwidth scheduling on the cache server according to the traffic information of each service type to keep the load of the cache server in good condition, which may effectively improve the quality of network services.

It should be noted that the bandwidth scheduling device for cache server provided in the foregoing embodiments is described by taking only the division of the foregoing functional modules as an example. In actual applications, the foregoing functions may be allocated by different functional modules as required. That is, the internal structure of the device is divided into different functional modules to complete all or part of the functions described above. In addition, the bandwidth scheduling device for cache server provided by the foregoing embodiments and the bandwidth scheduling method for cache server provided by the foregoing embodiments belong to the same concept. Specific implementation processes of the bandwidth scheduling device for cache server are referred to the method embodiments, and details are not described herein again.

Figure 4:
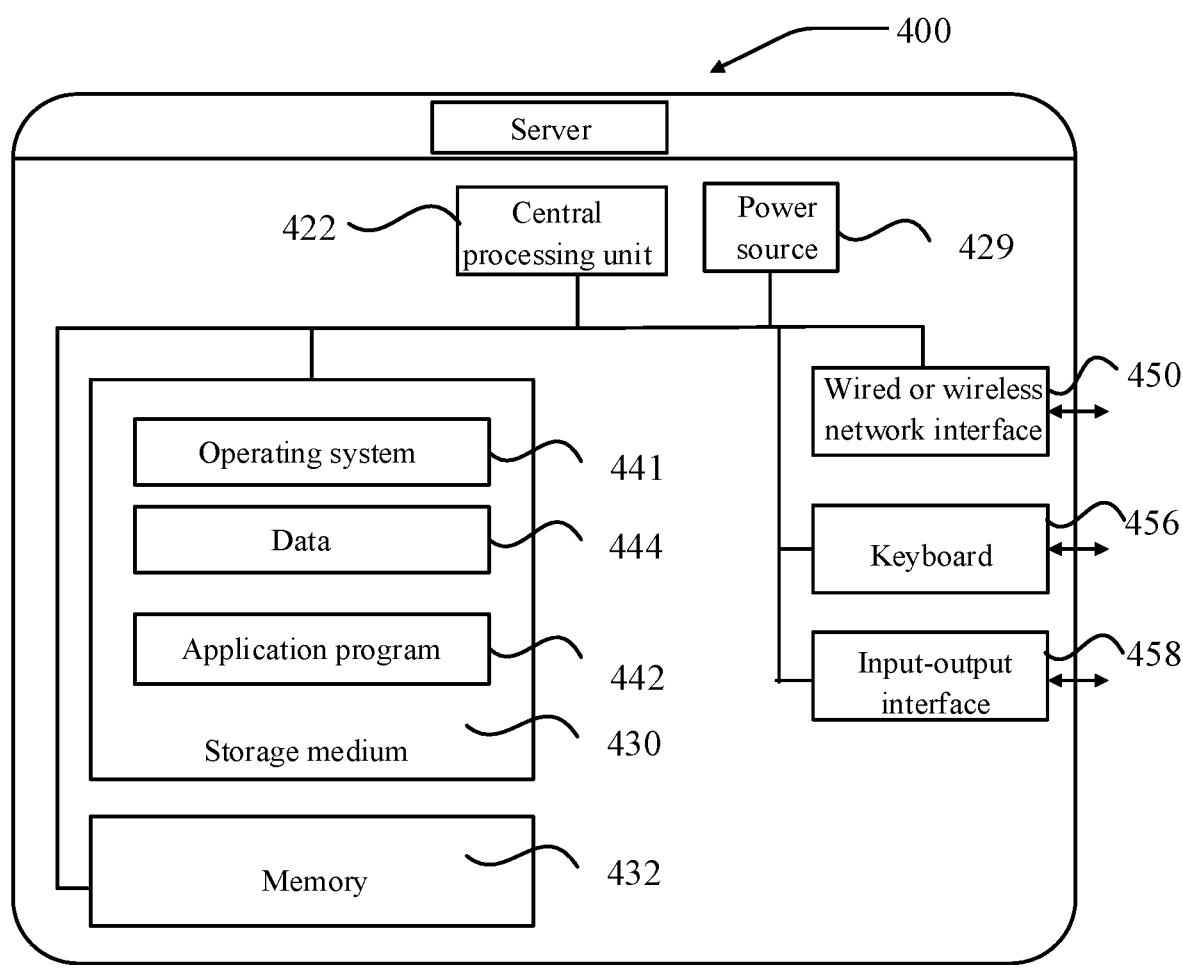
FIG. 4 is a structural schematic diagram of a server provided by embodiments of the present disclosure.

FIG. 4 is a structural schematic diagram of the server provided by the embodiments of the present disclosure. The server 400 may vary a lot due to different configurations or performance, and may include one or more central processing units 422 (for example, one or more processors) and a memory 432, one or more storage media 430 (e.g., one or more mass storage devices) that store applications program 442 or data 444. The memory 432 and the storage medium 430 may be temporary storage or persistent storage. Programs stored in the storage medium 430 may include one or more modules (not shown in the drawings), and each module may include a series of instruction operations on the server 400. Furthermore, the central processing unit 422 may be configured to communicate with the storage medium 430 and execute a series of instruction operations in the storage medium 430 on the server 400.

The server 400 may further include one or more power sources 429, one or more wired or wireless network interfaces 450, one or more input-output interfaces 458, one or more keyboards 456, and/or, one or more operating systems 441, such as Windows Server, Mac OS X, Unix, Linux, FreeBSD, etc.

The server 400 may include a memory, and one or more programs stored in the memory and configured to be executed by one or more processors, the one or more programs including instructions for performing bandwidth scheduling on the above cache server.

Those skilled in the art may appreciate that all or some steps that realize the above-described embodiments may be implemented through hardware, or may be implemented by instructing related hardware through a program which may be stored in a computer readable storage medium. The storage medium may be a read-only memory, a magnetic disc, or a compact disc.

The description above are only preferable embodiments of the present disclosure, but are not intended to impose a limitation to the present disclosure. Any amendment, equivalent substitution and improvement made within the spirit and principle of the present disclosure shall be included in the protection scope of the present disclosure.

What is claimed is:

1. A bandwidth scheduling method for cache server, comprising:
acquiring, in accordance with a pre-determined detection period, latest traffic information of a target cache server of each service type at a start time of the detection period;
acquiring a target health value calculation formula and a rated health value of the target cache server, the target health value calculation formula being fitted based on historical health values of the target cache server and historical traffic information of each service type; and
performing bandwidth scheduling on the target cache server based on the latest traffic information, the target health value calculation formula, and the rated health value, including:
calculating a target health value of the target cache server based on the target health value calculation formula and the latest traffic information; and
in response to the target health value being greater than the rated health value: calculating bandwidth amount of each client to which the latest traffic information belongs, selecting clients in succession as target call-out clients in order of bandwidth amount from small to large, calculating a first health value of the target cache server, and performing bandwidth scheduling according to the target call-out clients when the first health value of the target cache server is less than or equal to the rated health value; and
in response to the target health value being not greater than the rated health value: determining call-out clients of cache servers other than the target cache server at a current moment, selecting the call-out clients in succession as target call-in clients in order of bandwidth amount of the call-out clients from small to large, calculating a second health value of the target cache server, and performing bandwidth scheduling according to the target call-in clients when the second health value of the target cache server is less than or equal to the rated health value and a difference between the rated health value and the second health value of the target cache server is less than or equal to a pre-determined difference value.

2. The method according to claim 1, wherein the method further comprises:
acquiring, in accordance with a pre-determined formula update period, statistical data of each performance indicator of the target cache server within a historical duration before a start time of the formula update period, and calculating the historical health values of the target cache server at each moment within the historical duration based on the statistical data and a pre-determined performance health formula; and
acquiring the historical traffic information of the target cache server of each service type within the historical duration before the start time of the formula update period, and updating the target health value calculation formula of the target cache server based on the historical health values and the historical traffic information.

3. The method according to claim 2, wherein updating the target health value calculation formula of the target cache server based on the historical health values and the historical traffic information comprises:
determining a target server category to which the target cache server belongs, and updating the target health value calculation formula of the target cache server based on the historical health values, the target server category, and the historical traffic information.

4. The method according to claim 1, wherein determining call-out clients of cache servers other than the target cache server at a current moment comprises:
judging whether the target health value is less than an early warning health value; and
determining the call-out clients of the cache servers other than the target cache server at the current moment when the target health value is less than the early warning health value.

5. The method according to claim 1, wherein performing bandwidth scheduling on the target cache server based on the latest traffic information, the target health value calculation formula, and the rated health value comprises:
  calculating a target health value of the target cache server based on the target health value calculation formula and the latest traffic information, and judging whether the target health value is greater than the rated health value;
  in response to the target health value being greater than the rated health value: successively reducing traffic information of a target service type according to an adjustment gradient of the target service type corresponding to a target service category to which the target cache server belongs, and calculating a health value of the target cache server; and
  determining the reduced traffic information of the target service type as target call-out amount when the health value of the target cache server is less than or equal to the rated health value, and performing bandwidth scheduling according to the target call-out amount.

6. The method according to claim 1, wherein performing bandwidth scheduling on the target cache server based on the latest traffic information, the target health value calculation formula, and the rated health value comprises:
  calculating a target health value of the target cache server based on the target health value calculation formula and the latest traffic information, and judging whether the target health value is greater than the rated health value;
  in response to the target health value being not greater than the rated health value: determining call-out amount of a target service type of cache servers other than the target cache server at a current moment, successively increasing traffic information of the target service type based on the call-out amount according to an adjustment gradient of the target service type, and calculating a health value of the target cache server; and
  determining the increased traffic information as target call-in amount when the health value of the target cache server is less than or equal to the rated health value, and difference between the rated health value and the health value of the target cache server is less than or equal to a pre-determined difference value, and performing bandwidth scheduling according to the target call-in amount.

7. The method according to claim 1, wherein performing bandwidth scheduling on the target cache server based on the latest traffic information, the target health value calculation formula, and the rated health value comprises:
  calculating a target health value of the target cache server based on the target health value calculation formula and the latest traffic information, and judging whether the target health value is greater than the rated health value;
  in response to the target health value being greater than the rated health value: selecting a target call-out range from an adjustment range reference table of traffic information and health values of the target cache server, determining the target call-out range as target call-out amount, and performing bandwidth scheduling according to the target call-out amount.

8. The method according to claim 1, wherein performing bandwidth scheduling on the target cache server based on the latest traffic information, the target health value calculation formula, and the rated health value comprises:
  calculating a target health value of the target cache server based on the target health value calculation formula and the latest traffic information, and judging whether the target health value is greater than the rated health value;
  in response to the target health value being not greater than the rated health value: selecting a target call-in range from an adjustment range reference table of the of traffic information and health values of the target cache server, determining the target call-in range as target call-in amount, and performing bandwidth scheduling according to the target call-in amount.

9. The method according to claim 1, wherein the traffic information of each service type at least includes live broadcast bandwidth, a number of live broadcast connections, on-demand bandwidth, a number of on-demand connections, webpage bandwidth, and a number of webpage connections.

10. A server comprising:
  a processor; and
  a memory;
  wherein the memory stores at least one instruction, at least one program, a code set or an instruction set, when loaded and executed by the processor, causing the processor to implement a bandwidth scheduling method for cache server; and
  wherein the method comprises:
  acquiring, in accordance with a pre-determined detection period, latest traffic information of a target cache server of each service type at a start time of the detection period;
  acquiring a target health value calculation formula and a rated health value of the target cache server, the target health value calculation formula being fitted based on historical health values of the target cache server and historical traffic information of each service type; and
  performing bandwidth scheduling on the target cache server based on the latest traffic information, the target health value calculation formula, and the rated health value, including:
    calculating a target health value of the target cache server based on the target health value calculation formula and the latest traffic information; and
    in response to the target health value being greater than the rated health value: calculating bandwidth amount of each client to which the latest traffic information belongs, selecting clients in succession as target call-out clients in order of bandwidth amount from small to large, calculating a first health value of the target cache server, and performing bandwidth scheduling according to the target call-out clients when the first health value of the target cache server is less than or equal to the rated health value; and
    in response to the target health value being not greater than the rated health value: determining call-out clients of cache servers other than the target cache server at a current moment, selecting the call-out clients in succession as target call-in clients in order of bandwidth amount of the call-out clients from small to large, calculating a second health value of the target cache server, and performing bandwidth scheduling according to the target call-in clients when the second health value of the target cache server is less than or equal to the rated health value and a difference between the rated health value and the second health value of the target cache server is less than or equal to a pre-determined difference value.

11. The server according to claim 10, wherein the method further comprises:
  acquiring, in accordance with a pre-determined formula update period, statistical data of each performance indicator of the target cache server within a historical duration before a start time of the formula update period, and calculating the historical health values of the target cache server at each moment within the historical duration based on the statistical data and a pre-determined performance health formula; and acquiring the historical traffic information of the target cache server of each service type within the historical duration before the start time of the formula update period, and updating the target health value calculation formula of the target cache server based on the historical health values and the historical traffic information.

12. The server according to claim 11, wherein updating the target health value calculation formula of the target cache server based on the historical health values and the historical traffic information comprises:

determining a target server category to which the target cache server belongs, and updating the target health value calculation formula of the target cache server based on the historical health values, the target server category, and the historical traffic information.

13. The server according to claim 10, wherein determining call-out clients of cache servers other than the target cache server at a current moment comprises:

judging whether the target health value is less than an early warning health value; and determining the call-out clients of the cache servers other than the target cache server at the current moment when the target health value is less than the early warning health value.

14. The server according to claim 10, wherein performing bandwidth scheduling on the target cache server based on the latest traffic information, the target health value calculation formula, and the rated health value comprises:

calculating a target health value of the target cache server based on the target health value calculation formula and the latest traffic information, and judging whether the target health value is greater than the rated health value;

in response to the target health value being greater than the rated health value: successively reducing traffic information of a target service type according to an adjustment gradient of the target service type corresponding to a target service category to which the target cache server belongs, and calculating a health value of the target cache server; and determining the reduced traffic information of the target service type as target call-out amount when the health value of the target cache server is less than or equal to the rated health value, and performing bandwidth scheduling according to the target call-out amount.

15. The server according to claim 10, wherein performing bandwidth scheduling on the target cache server based on the latest traffic information, the target health value calculation formula, and the rated health value comprises:

calculating a target health value of the target cache server based on the target health value calculation formula and the latest traffic information, and judging whether the target health value is greater than the rated health value;

in response to the target health value being not greater than the rated health value: determining call-out amount of a target service type of cache servers other than the target cache server at a current moment, successively increasing traffic information of the target service type based on the call-out amount according to an adjustment gradient of the target service type, and calculating a health value of the target cache server; and determining the increased traffic information as target call-in amount when the health value of the target cache server is less than or equal to the rated health value, and difference between the rated health value and the health value of the target cache server is less than or equal to a pre-determined difference value, and performing bandwidth scheduling according to the target call-in amount.

16. A non-transitory computer-readable storage medium storing at least one instruction, at least one program, a code set or an instruction set, when loaded and executed by a processor, causing the processor to implement a bandwidth scheduling method for a cache server, the bandwidth scheduling method comprising:

acquiring, in accordance with a pre-determined detection period, latest traffic information of a target cache server of each service type at a start time of the detection period;

acquiring a target health value calculation formula and a rated health value of the target cache server, the target health value calculation formula being fitted based on historical health values of the target cache server and historical traffic information of each service type; and performing bandwidth scheduling on the target cache server based on the latest traffic information, the target health value calculation formula, and the rated health value, including:

calculating a target health value of the target cache server based on the target health value calculation formula and the latest traffic information; and in response to the target health value being greater than the rated health value: calculating bandwidth amount of each client to which the latest traffic information belongs, selecting clients in succession as target call-out clients in order of bandwidth amount from small to large, calculating a first health value of the target cache server, and performing bandwidth scheduling according to the target call-out clients when the first health value of the target cache server is less than or equal to the rated health value; and in response to the target health value being not greater than the rated health value: determining call-out clients of cache servers other than the target cache server at a current moment, selecting the call-out clients in succession as target call-in clients in order of bandwidth amount of the call-out clients from small to large, calculating a second health value of the target cache server, and performing bandwidth scheduling according to the target call-in clients when the second health value of the target cache server is less than or equal to the rated health value and a difference between the rated health value and the second health value of the target cache server is less than or equal to a pre-determined difference value.

* * * * *